(12) United States Patent
Ishikawa

(10) Patent No.: US 6,370,334 B1
(45) Date of Patent: Apr. 9, 2002

(54) IMAGING APPARATUS, A DRIVE MECHANISM AND A METHOD OF DRIVING THE MECHANISM

(75) Inventor: Yoshihiro Ishikawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/618,453

(22) Filed: Jul. 18, 2000

(30) Foreign Application Priority Data

Sep. 10, 1999 (JP) .......................................... 11-258090

(51) Int. Cl.[7] .............................. G03B 7/10; G03B 9/02; G03B 13/34
(52) U.S. Cl. ...................... 396/132; 396/259; 396/505; 396/74; 396/75; 396/83
(58) Field of Search ................................. 396/132, 259, 396/260, 508, 505, 74, 75, 83; 348/357, 362–366, 345

(56) References Cited

U.S. PATENT DOCUMENTS 4,695,144 A * 9/1987 Yoshino et al. ............. 396/132

FOREIGN PATENT DOCUMENTS

JP 5-40883 6/1993 ............ G02B/7/04

* cited by examiner

Primary Examiner—W. B. Perkey

(57) ABSTRACT

A drive mechanism for moving a lens and adjusting a diaphragm by a driving force supplied by a single drive source, comprising: a transmission mechanism capable of taking a first transmitting condition by which the driving force is transmitted for both adjusting the diaphragm and moving the lens; and a second transmitting condition by which the driving force is transmitted for either adjusting the diaphragm or moving the lens. Both the lens and the diaphragm are driven while the drive source is supplying the driving force to the transmission mechanism taking the first transmitting condition, and either the lens or the diaphragm is driven while the drive source is supplying the driving force to the transmission mechanism taking the second transmitting condition.

20 Claims, 9 Drawing Sheets (a) OPEN (b) SMALL APERTURE (a) OPEN (b) SMALL APERTURE (a) APERTURE 64b (b) APERTURE 64a (c) OPEN

IMAGING APPARATUS, A DRIVE MECHANISM AND A METHOD OF DRIVING THE MECHANISM

This patent application claims priority based on a Japanese patent application, H11-258090 filed on Sep. 10, 1999, the contents of which are incorporated herein by reference.

BACKGROUND OF THE INVENTION

1. Field of the Invention

The present invention relates to an imaging apparatus, a drive mechanism and a method of driving the mechanism. More particularly, the present invention relates to a drive mechanism driving a lens and a diaphragm by a driving force supplied by a single drive source, a method of driving the mechanism, and an imaging apparatus including the drive mechanism.

2. Description of the Related Art

A drive mechanism that provides a driving force generated by a single drive source for driving a lens and a diaphragm is disclosed in Japanese Patent Application Publication No. H5-40883. This drive mechanism is provided by a motor that can supply a driving force capable of rotating two ways, a rotation member attached to a fixed portion in an optical lens device in a rotatable manner, and a transmitting means transmitting the rotation force from the motor to the rotation member and a lens barrel placed on a predetermined position inside the rotation member which holds a lens which is to be moved. The drive mechanism further includes: a converting means provided between the rotation member and the lens, converting the rotation motion to a liner motion by transmitting the rotation force of the rotation member to the lens barrel via a predetermined friction force to linearly move the lens barrel; a conventional diaphragm mechanism attached to the lens barrel and formed with a diaphragm drive member protruding outwardly, controlling a plurality of diaphragm blades formed inside the diaphragm mechanism to open and close; and a protruding portion protruding from the fixed portion, freely connected to the diaphragm drive member in the direction of the optical axis of the lens, the protruding portion being a fulcrum in the rotational direction.

However, the lens starts moving after an idle time caused by the diaphragm drive member, thus, the start of movement of the lens delays for the idle time with respect to the transmission of the driving force. Furthermore, as the rotational movement of the rotation member is converted to linear movement of the lens barrel, a shift of the optical axis caused by the rotation of the rotation member may result in inaccuracy of the focussing position.

SUMMARY OF THE INVENTION

Therefore, it is an object of the present invention to provide a drive mechanism driving a lens and a diaphragm by a driving force supplied by a single drive source, a method of driving the mechanism, and an imaging apparatus including the drive mechanism, which overcome the above issues in the related art. This object is achieved by combinations described in the independent claims. The dependent claims define further advantageous and exemplary combinations of the present invention.

According to the first aspect of the present invention, a drive mechanism for moving a lens and adjusting a diaphragm using a driving force supplied by a single drive source, comprises a transmission mechanism capable of taking a first transmitting condition by which the driving force is transmitted for both adjusting the diaphragm and moving the lens, and a second transmitting condition by which the driving force is transmitted for either adjusting the diaphragm or moving the lens; wherein both the lens and the diaphragm are driven while the drive source is supplying the driving force to the transmission mechanism taking the first transmitting condition, and either the lens or the diaphragm is driven while the drive source is supplying the driving force to the transmission mechanism taking the second transmitting condition.

The transmission mechanism may include a slip mechanism provided between the drive source and at least one of the diaphragm and the lens, the slip mechanism transmitting the driving force to at least one of the diaphragm and the lens via a frictional force generated by the slip mechanism while the drive source is supplying the driving force to the transmission mechanism taking the first transmitting condition, and disconnecting transmission of the driving force to at least one of the diaphragm and the lens by slipping between the driving source and the at least one of the diaphragm and the lens while the drive source is supplying the driving force to the transmission mechanism taking the second transmitting condition.

The drive mechanism may further include a lens moving mechanism moving the lens along an optical axis of the lens, the drive source and the lens moving mechanism being connected without the slip mechanism therebetween, and the drive source and the diaphragm being connected via the slip mechanism, the slip mechanism disconnecting transmission of the driving force to the diaphragm by slipping between the driving source and the diaphragm and transmitting the driving force to the lens while the drive source is supplying the driving force to the transmission mechanism taking the second transmitting condition.

The diaphragm may comprise: a diaphragm plate adjusting luminous energy applied to the lens; and a position restrictor restricting a movement range of the diaphragm plate such that the diaphragm plate 50 can only move as necessary for adjusting the diaphragm, wherein the slip mechanism may be provided between the drive source and the diaphragm plate, and the slip mechanism disconnects transmission of the driving force to the diaphragm by slipping between the driving source and the diaphragm when the position restrictor restricts movement of the diaphragm plate.

The drive source may supply the driving force to either a forward driving direction or a backward driving direction, the lens moving mechanism may include a mechanism moving the lens along the optical axis thereof in accordance with the driving direction of the driving force, and the diaphragm mechanism may include a mechanism moving the diaphragm plate between a first position to a second position, both provided within the moving range in accordance with the driving direction of the driving force.

The lens moving mechanism may move the lens within a moving range including a first range necessary for moving the lens to focus on a subject, and a second range necessary for moving the lens in order for the diaphragm plate to move from the first position to the second position or from the second position to the first position of the lens.

The drive source may supply the driving force until the lens moves to the focussing position, further supplies the driving force, in a same direction, for a movement amount necessary for having the diaphragm plate move from the first position to the second position, or from the second position to the first position, and supplies the driving force, in an opposite direction from the same direction, for the movement amount necessary for changing, when the driving direction of the driving force for moving the lens to a focussing point where the lens is focused on the subject and the driving direction of the driving force for moving the diaphragm plate to a desired either the first position or the second position, are not same.

The drive source may supply the driving force until the lens moves to the focussing position, when the driving direction of the driving force for moving the lens to a focussing point where the lens is focused on the subject and the driving direction of the driving force for moving the diaphragm plate to desired either the first position or the second position, are same.

The diaphragm plate may be formed with a plurality of apertures each having different diameters, the diaphragm plate being moved by the drive source supplying the driving force until the lens moves to the focussing position, further supplying the driving force in a same direction for a movement amount necessary for having a desired aperture from among the plurality of apertures overlie a predetermined position, and supplying the driving force in an opposite direction from the same direction for the movement, such that light is applied to the lens through the desired aperture.

According to the second aspect of the present invention, a method of driving for moving a lens and adjusting a diaphragm by a driving force supplied by a single drive source, comprises: driving the lens and the diaphragm while the drive source is supplying the driving force to the transmission mechanism, taking a first transmitting condition by which the driving force is transmitted for both adjusting the diaphragm and moving the lens, and driving either the lens or the diaphragm while the drive source is supplying the driving force to the transmission mechanism taking the second transmitting condition, by which the driving force is transmitted for either adjusting the diaphragm or moving the lens.

According to the third aspect of the present invention, a method of driving for moving a lens to a focussing point where the lens is focussed on a subject and adjusting a diaphragm based on brightness of the subject, comprises: determining a condition for the diaphragm used for photographing the subject by detecting brightness of the subject, detecting the focussing position; and judging whether a first driving direction for moving the lens to the focussing position and a second driving direction for moving a diaphragm plate shutting out light to be applied to the lens to either a first position or a second position, are same; the method further comprising, when the driving directions are same, supplying the driving force for moving the lens to the focussing position the method further comprising, when the driving directions are not same, supplying the driving force until the lens moves to the focussing position, further supplying the driving force, in a same direction, for a movement amount necessary for having the diaphragm plate move from the first position to the second position, or from the second position to the first position, and supplying the driving force, in an opposite direction from the same direction, for the movement amount necessary for changing.

According to the fourth aspect of the present invention, An imaging apparatus for photographing a desired subject, comprising: an imaging unit forming an image of the subject; a lens imaging the subject on the imaging unit; a diaphragm adjusting luminous energy applied to the lens; and a drive mechanism moving the lens and adjusting the diaphragm by a driving force supplied from a drive source; wherein the drive mechanism comprising a transmission mechanism capable of taking a first transmitting condition by which the driving force is transmitted for both adjustment of the diaphragm and movement of the lens, and a second transmitting condition by which the driving force is transmitted for either adjustment of the diaphragm or movement of the lens; and both the lens and the diaphragm are driven while the drive source is supplying the driving force to the transmission mechanism taking the first transmitting condition, and either the lens or the diaphragm is driven while the driving source is supplying the driving force to the transmission mechanism taking the second transmitting condition.

The transmission mechanism may include a slip mechanism provided between the drive source and at least one of the diaphragm and the lens, the slip mechanism transmitting the driving force to at least one of the diaphragm and the lens via a frictional force generated by the slip mechanism while the drive source is supplying the driving force to the transmission mechanism taking the first transmitting condition, and disconnecting transmission of the driving force to at least one of the diaphragm and the lens by slipping between the driving source and the at least one of the diaphragm and the lens while the drive source is supplying the driving force to the transmission mechanism taking the second transmitting condition.

The drive mechanism may further include a lens moving mechanism moving the lens along an optical axis of the lens, the drive source and the lens moving mechanism being connected without the slip mechanism therebetween, and the drive source and the diaphragm being connected via the slip mechanism, the slip mechanism disconnecting transmission of the driving force to the diaphragm by slipping between the driving source and the diaphragm and transmitting the driving force to the lens while the driving source is supplying the driving force to the transmission mechanism taking the second transmitting condition.

The diaphragm may comprise: a diaphragm plate adjusting luminous energy applied to the lens; and a position restrictor restricting a movement range of the diaphragm plate such that the diaphragm plate 50 can only move as necessary for adjusting the diaphragm, wherein the slip mechanism may be provided between the drive source and the diaphragm plate, and the slip mechanism disconnects transmission of the driving force to the diaphragm by slipping between the driving source and the diaphragm when the position restrictor restricts movement of the diaphragm plate.

The drive source may supply the driving force in either a forward driving direction or a backward driving direction, the lens moving mechanism may include a mechanism moving the lens along the optical axis thereof in accordance with the driving direction of the driving force, and the diaphragm mechanism includes a mechanism moving the diaphragm plate between a first position to a second position, both provided within the moving range in accordance with the driving direction of the driving force.

The lens moving mechanism may move the lens within a moving range including a first range necessary for moving the lens to focus on a subject, and a second range necessary for moving the lens in order for the diaphragm plate to move from the first position to the second position or from the second position to the first position of the lens.

The drive source may supply the driving force until the lens moves to the focussing position, further supplies the driving force, in a same direction for an amount necessary for having the diaphragm plate move from the first position to the second position, or from the second position to the first position, and supplies the driving force in an opposite direction from the same direction for the amount necessary for changing, when the driving direction of the driving force for moving the lens to a focussing point where the lens is focused on the subject and the driving direction of the driving force for moving the diaphragm plate to desired either of the first position or the second position, are not same.

The drive source may supply the driving force until the lens moves to the focussing position, when the driving direction of the driving force for moving the lens to a focussing point where the lens is focused on the subject and the driving direction of the driving force for moving the diaphragm plate to desired either of the first position or the second position, are same.

The imaging unit may generate image data by converting the image of the subject into electric signals, the imaging apparatus further comprises a memory unit storing the image data.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
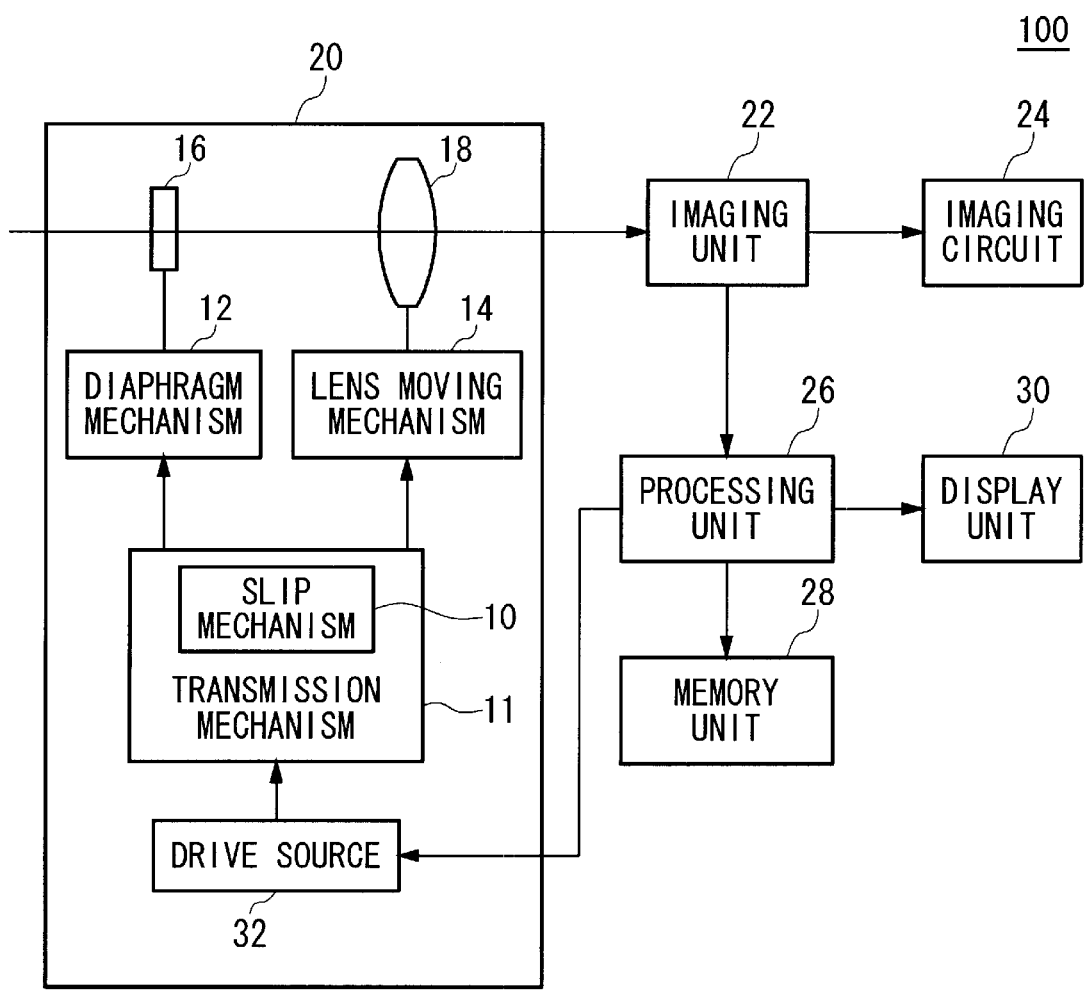
FIG. 1 shows a block diagram of the imaging apparatus 100.

FIG. 1 shows a block diagram of an imaging apparatus 100. The imaging apparatus 100 includes a drive mechanism 20, an imaging unit 22, an imaging circuit 24, a processing unit 26, a memory unit 28 and a display unit 30. The imaging apparatus 100 may be, for example, a digital camera storing an image of a subject as digital data.

The drive mechanism 20 includes a drive source 32, a transmission mechanism 11, a diaphragm adjusting mechanism 12, a lens moving mechanism 14, a diaphragm 16 and a lens 18. The transmission mechanism 11 includes a slip mechanism 10. The drive source 32 supplies a driving force to the transmission mechanism 11, based on the signal output from the processing unit 26. The transmission mechanism 11 transmits the driving force supplied by the drive source 32 to the diaphragm adjusting mechanism 12 and the lens moving mechanism 14. The diaphragm adjusting mechanism 12 adjusts the aperture condition of the diaphragm 16 using the driving force supplied from the transmission mechanism 11. The lens moving mechanism 14 moves the position of the lens 18 using the driving force supplied from the transmission mechanism 11.

The transmission mechanism 11 takes either of two operational conditions including a first condition where the mechanism 11 is capable of conducting both adjustment of the diaphragm 16 and movement of the lens 18 and a second condition where the mechanism 11 is capable of conducting either adjustment of the diaphragm 16 or movement of the lens 18.

When the transmission mechanism 11 takes the first operational condition, the transmission mechanism 11 transmits the driving force supplied from the power source 32 to both the diaphragm adjusting mechanism 12 and the lens moving mechanism 14. When the transmission mechanism 11 takes the second operational condition, the transmission mechanism 11 transmits the driving force supplied from the power source 32 to either the diaphragm adjusting mechanism 12 or the lens moving mechanism 14. The slip mechanism 10 is preferably capable of disconnecting provision of the driving force to either the diaphragm adjusting mechanism 12 or the lens moving mechanism 14 by slipping when the mechanism 11 takes the second operational condition. Thus, at this time, the mechanism 11 transmits the driving force to the other of the diaphragm adjusting mechanism 12 or the lens moving mechanism 14.

The imaging unit 22 converts the image of a subject into electric signals and outputs the signals to the imaging circuit 24. The imaging unit 22 may be, for example, a charged coupled device, which will be simply referred to as a CCD hereinafter, and is ideally capable of converting light into electric signals. The imaging circuit 24 undertakes a predetermined operation in which the electric signals of the image of the subject are formed into image data and output to the processing unit 26. The processing unit 26 displays the image of the subject on the display unit 30, and stores the image data in the memory unit 28.

As for another embodiment, the drive mechanism 20 of the present invention may be used as a drive mechanism of a silver halide type camera or a video camera.

Figure 2:
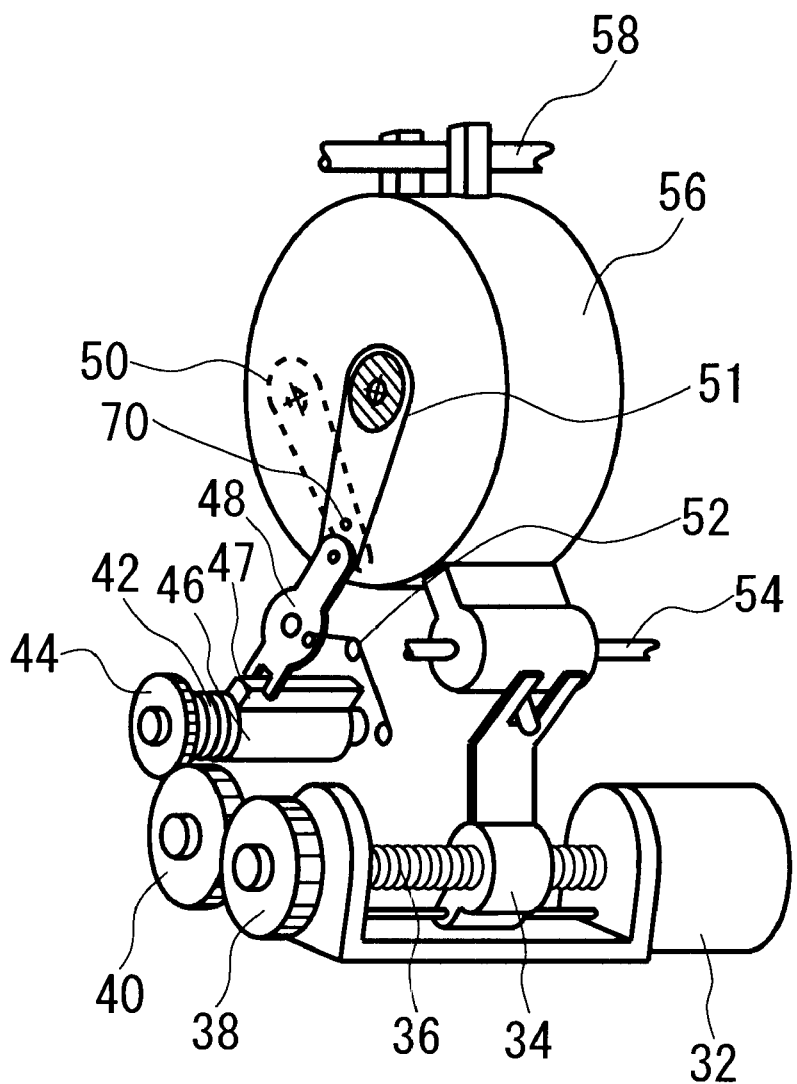
FIG. 2 is a perspective view of the drive mechanism 20.

FIG. 2 is a perspective view of the drive mechanism 20. The lens moving mechanism 14 is comprised of a focus member 34, a lead screw 36 and a moving frame 56. The drive source 32 supplies the driving force to the lead screw 36. The driving force supplied by the drive source 32 rotates the lead screw 36 in order to have the focus member 34 move forward and backward in a direction parallel with respect to the optical axis of the lens 18. The moving frame 56 supports the lens 18, not shown in FIG. 2 but shown in FIG. 1, and is connected to the focus member 34. Thus, the moving frame 56 moves with the focus member 34 along guide bars 54 and 58 in the direction of the optical axis of the lens 18. It means that the driving force supplied by the drive source 32 moves the lens 18 in the direction of its optical axis.

The driving force generated by the drive source 32 is further transmitted to the diaphragm adjusting mechanism 12 through an output gear 38 and an idler gear 40. The diaphragm adjusting mechanism 12 is comprised of a slip spring 42, a slip gear 44, a diaphragm drive shaft 46, a linkage 48, a diaphragm plate 50 and a torsion spring 52. The diaphragm drive shaft 46 is formed with a protruding portion 47. The driving force is transmitted to the linkage 48 via the protruding portion 47. The torsion spring 52 is designed to fill a space between the protruding portion 47 and the linkage 48 to prevent vibration of the diaphragm plate 50. The slip mechanism 10 shown in FIG. 1 is comprised of a slip spring 42, a slip gear 44 and a diaphragm drive shaft 46 shown in FIG. 2.

Figure 3:
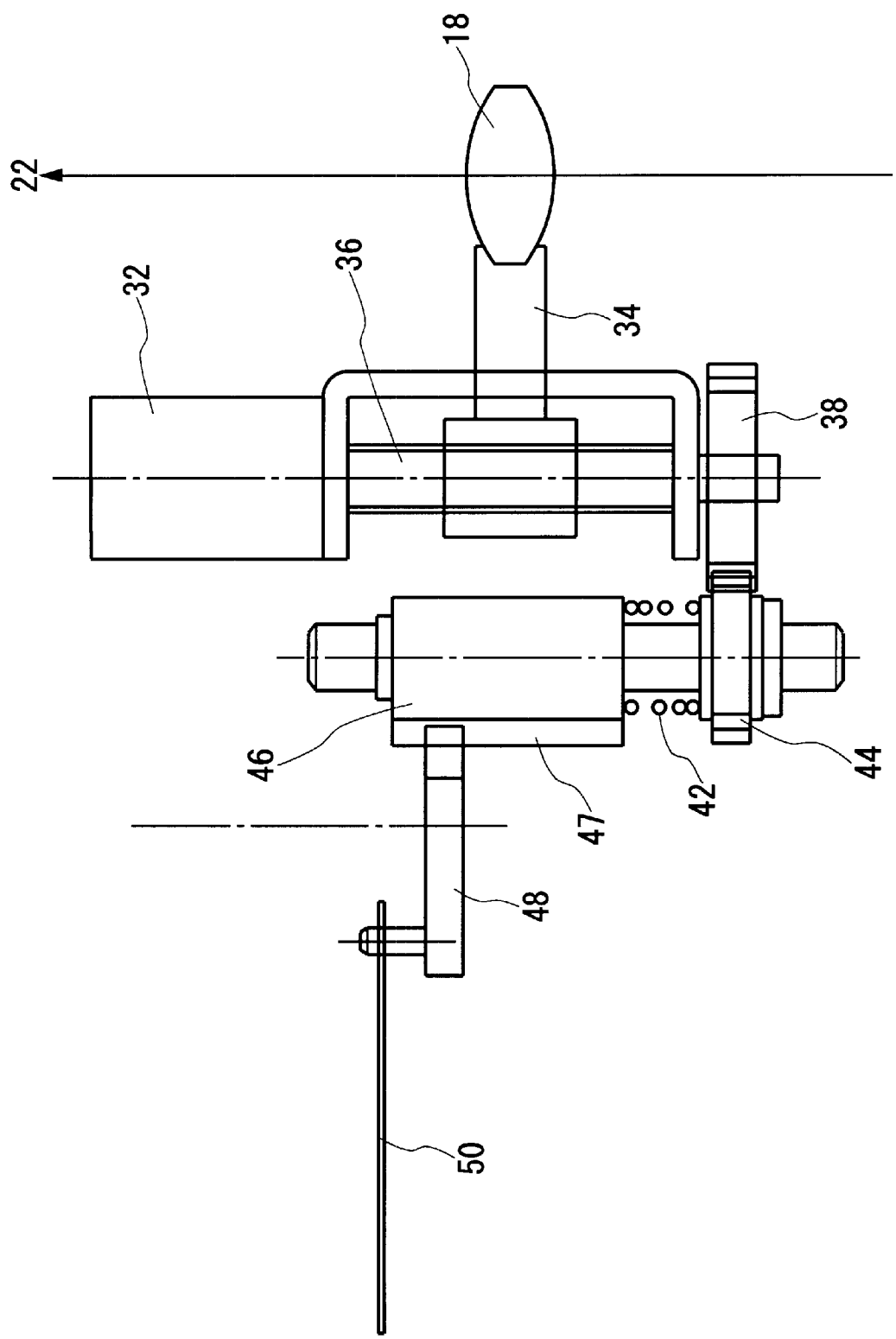
FIG. 3 shows a side view of the drive mechanism 20.

FIG. 3 shows a side view of the drive mechanism 20. The drive source 32 may be, for example, a stepping motor or a servo motor, and is preferably capable of providing the driving force to the lead screw 36 for moving in either a normal driving direction or an opposite driving direction. The focus member 34 is connected to the lead screw 36 and moves forward and backward along the optical axis of the lens 18 in accordance with the driving direction of the lead screw 36. As the moving frame 56, not shown in FIG. 3, is connected to the focus member 34, the lens 18 also moves forward and backward along its optical axis, with the focus member 34. The output gear 38 transmits the driving force to the slip gear 44 via the idler gear 40, not shown in FIG. 3.

The slip spring 42 is provided between the slip gear 44 and the diaphragm drive shaft 46 to create a friction force between these elements. Due to this friction force, the diaphragm drive shaft 46 is moved with the slip gear 44. Thus, when a force larger than the static friction force generated by the slip spring 42 is applied to the slip gear 44, the slip gear 44 slips with respect to the diaphragm drive shaft 46. At this time, even when the slip gear 44 is rotated, the diaphragm drive shaft 46 does not move. The driving force does not transmit to the diaphragm plate 50.

In another embodiment, the slip spring 42 may be altered by a member that generates a friction force. The member embodied for this purpose may be an elastic member such as rubber, or a viscous material having a predetermined viscosity. The movement direction of the diaphragm drive shaft 46 varies in accordance with the movement direction of the lens 18.

The movement amount of the lens 18 and the movement amount of the diaphragm plate 50 are determined based on the ratio of the diameters of the output gear 38 and the slip gear 44. The diaphragm plate 50 moves in accordance with the movement amount of the lens 18, thus, it is desirable that the diaphragm plate 50 is moved a lot by a only small movement of the lens 18. For example, the movement amount of the diaphragm plate 50 with respect to the movement amount of the lens 18 should be set based on the embodied optical system. Preferably, in one embodiment, the ratio of the movement amount of the lens 18 to the movement amount of the diaphragm plate 50 may be 1:5 to 1:15. More preferably, the ratio of the movement amount of the lens 18 to the movement amount of the diaphragm plate 50 may be 1:8 to 1:12. Thus, the lens and the diaphragm can be driven by the driving force provided from a single drive source 32.

Figure 4:
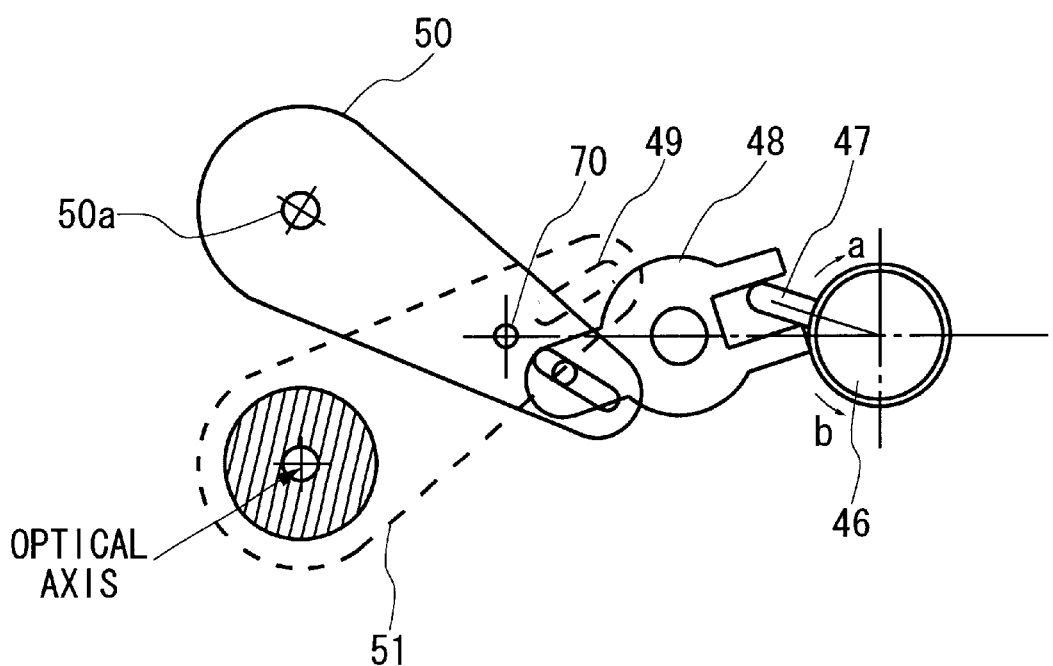
FIG. 4 shows a cross-sectional view of the diaphragm adjusting mechanism 12.

FIG. 4 shows a cross-sectional view of the diaphragm adjusting mechanism 12. The diaphragm plate 50 is formed with an aperture 50a. The diaphragm plate 50 is rotatable around a rotation axis 70. In this embodiment, the drive mechanism 20 can select either of the aperture conditions for the diaphragm, including an open condition or a small aperture condition.

The diaphragm drive shaft 46 transmits the driving force to the linkage 48 via the protruding portion 47. For example, when the diaphragm drive shaft 46 rotates in a direction "a" in FIG. 4, the diaphragm plate 50 moves away from the optical axis, thus making the diaphragm take the open condition. When, on the other hand, the diaphragm drive shaft 46 rotates in a direction "b" in FIG. 4, the diaphragm plate 50 takes position 51 shown by a broken line, making the diaphragm take the small aperture condition. The diaphragm adjusting mechanism 12 further includes a position restrictor 49 that restricts the range of movement of the diaphragm plate 50. For example, the position restrictor 49 may be an aperture having a rectangular shape that receives a protrusion of the linkage 48, to connect the diaphragm plate 50 and the linkage 48. Thus, the movement range of the diaphragm plate 50 is restricted by a position restrictor 49 provided to the diaphragm plate 50. As the movement of the diaphragm plate 50 is restricted, a force larger than the static friction force generated by the slip spring 42 is applied to the diaphragm drive shaft 46. At this time, even when the slip gear 44 is rotated, the diaphragm drive shaft 46 does not move.

The amount of movement of the lens 18 necessary for changing the condition of the diaphragm, by moving the diaphragm plate 50 from the position where the diaphragm takes the open condition to the position where the diaphragm takes the small aperture condition, depends on the ratio of the diameters of the slip gear 44 to the output gear 38. This amount of movement of the lens 18 necessary for changing the condition of the diaphragm will be referred to as, "movement amount necessary for changing", in the following.

Figure 5:
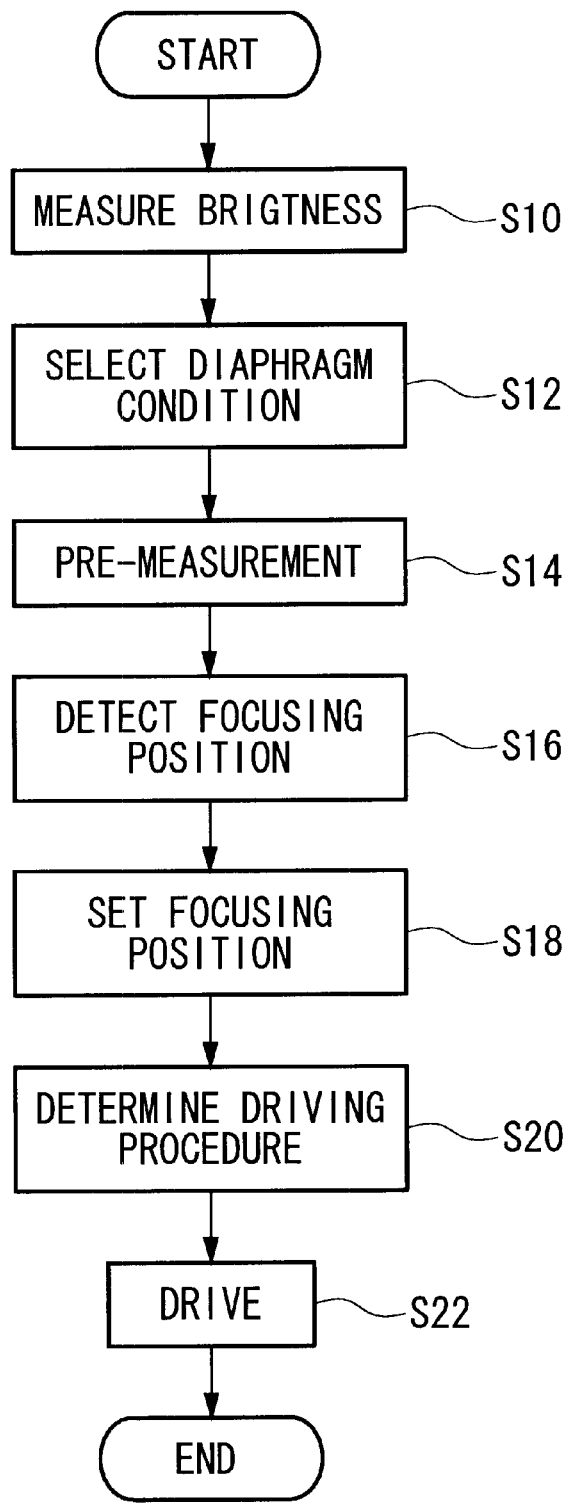
FIG. 5 shows a flowchart of the method of driving the drive mechanism 20.

FIG. 5 shows a flowchart for driving the drive mechanism 20. The imaging apparatus 100 measures the brightness of the subject (step S10), and selects the condition of the diaphragm in accordance with the brightness of the subject (step S12). The imaging apparatus 100 moves the lens 18 from one edge to another edge of a movable range for the lens 18 and continuously measures the brightness of a predetermined area of the subject for focusing the lens 18 on the subject (step S14). The imaging apparatus 100 detects the position of the lens 18 where the highest frequency component occurs, based on the obtained data related to the brightness and the position of the lens 18. The imaging apparatus 100 detects, for example, the position of the lens 18 as a focussing position where the brightness of each picture element varies most (step S16).

The detected focussing position is set as a movement position of the lens 18 (step S18). The driving procedure is determined based on the condition for the diaphragm selected at step S12 and the focussing position (step S20). The power source 32 supplies the driving force based on the determined driving procedure (step S22).

Figure 6:
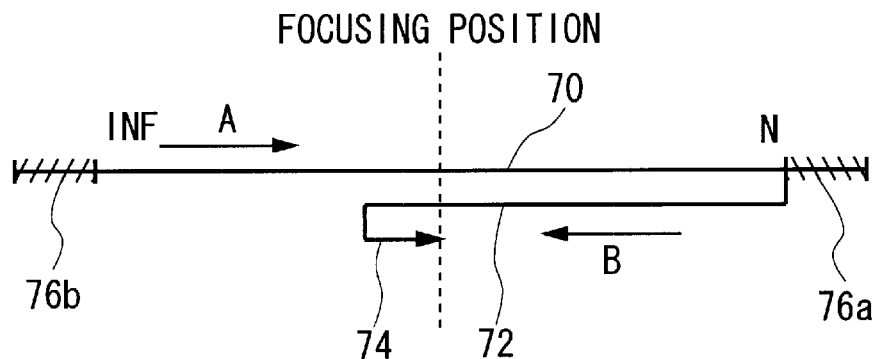
FIG. 6(a) shows the movement of the lens 18.
FIG. 6(b) shows the movement of the lens 18.
Figure 6:
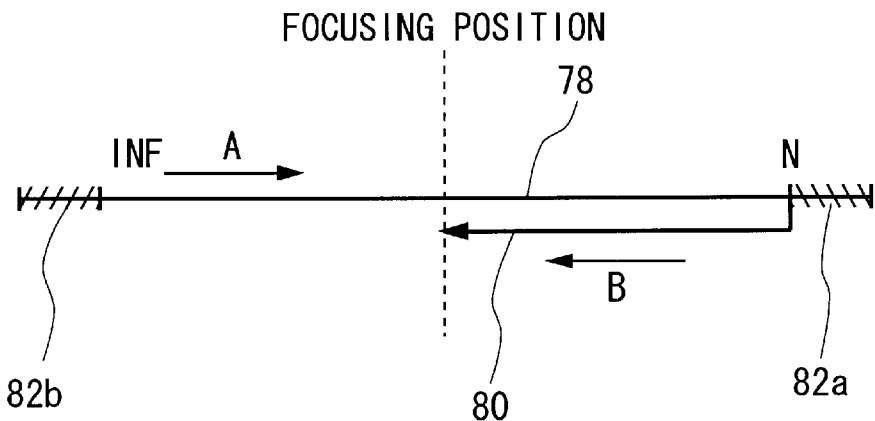

FIGS. 6(a) and 6(b) show the movement of the lens 18 in driving the drive mechanism 20, in accordance with step S14 to step S22 of FIG. 5. In FIG. 6(a), the transverse direction shows the position of the lens 18, and the vertical direction shows the time course. Oblique lines 76a, 76b, 82a and 82b in FIGS. 6(a) and 6(b) respectively show the movement amount necessary for changing. The lens 18 is capable of positioning between a point at infinity INF and a proximate point N for focussing the subject. The movement amounts necessary for changing, shown by the oblique lines 76a, 76b, 82a and 82b, are provided such that the diaphragm plate 50 can be moved to take either of the desired conditions for the diaphragm even when the focussing point becomes the point at infinity INF or the proximate point N.

The area between the point at infinity INF and the proximate point N will be referred to as "a predetermined moving area" in the following. The lens moving mechanism 14 is capable of moving the lens 18 within the area including the predetermined moving area and the movement amount necessary for changing. A direction from the point of infinity INF to the proximate point N is defined as a direction A, and a direction from the proximate point N to the point at infinity INF is defined as a direction B in FIGS. 6(a) and 6(b). It is obvious to those skilled in the art that the relationship between the movement direction of the lens 18 and the condition for the diaphragm can be arbitrarily set by the driving force, in other words, the transmission mechanism. In this embodiment, it is assumed that when the lens 18 moves along the direction A, the diaphragm plate 50 is moved in order to have the diaphragm in the open condition, and when the lens 18 moves along the direction B, the diaphragm has the small aperture condition.

FIG. 6(a) shows the movement of the lens 18, in which the lens 18 is moved to a focussing position and then the diaphragm plate 50 is moved in order to have the diaphragm take the open condition. The movement of the lens 18 will be explained with reference to FIG. 6(a) and the flowchart of FIG. 5. A path 70 shows the movement of the lens 18 at step s14 of FIG. 5. Firstly, the lens 18 moves from the point at infinity INF to the proximate point N for detecting a focussing point. The position within the path 70, where the highest frequency component occurs, is set as the focussing point.

Paths 72 and 74 show the movement of the lens 18 at step 22 of FIG. 5. In the path 72, the actual movement direction of the lens 18 and the movement direction of the lens 18 for moving the diaphragm plate 50 in order to take the open condition, are not the same. Therefore, the lens 18 further moves in the direction B from the focussing point, for the movement amount necessary for changing. In the path 74, the lens 18 moves in the direction A for the movement amount necessary for changing. Thus, the lens 18 moves to the focussing position with the diaphragm taking the open condition. Furthermore, as the lens 18 moves in the same direction A in which the focussing point is detected, any error caused by backlash can be prevented.

FIG. 6(b) shows the movements of the lens 18, by which the lens 18 is moved to a focussing position and then the diaphragm plate 50 is moved in order to have the diaphragm take the small aperture condition. The movement of the lens 18 will be explained with reference to FIG. 6(b) and the flowchart of FIG. 5. A path 78 shows the movement of the lens 18 at step s14 of FIG. 5 and is the same as the path 70. Therefore, explanation to the path 78 will be omitted here. A path 80 shows the movement of the lens 18 at step s22 of FIG. 5. In the path 80, the actual movement direction of the lens 18 and the movement direction of the lens 18 for moving the diaphragm plate 50 in order to have the diaphragm take the small aperture condition, are the same. Thus, in this case, by moving the lens 18 to the focussing position, the diaphragm has the desired small aperture condition. As the lens 18 moves in the direction B, which is opposite to the direction A where the focussing point is detected, there may be error caused by backlash. However, since the diaphragm has the small aperture condition, depth of focus is large, so there will be little influence of the error caused by the backlash.

Figure 7:
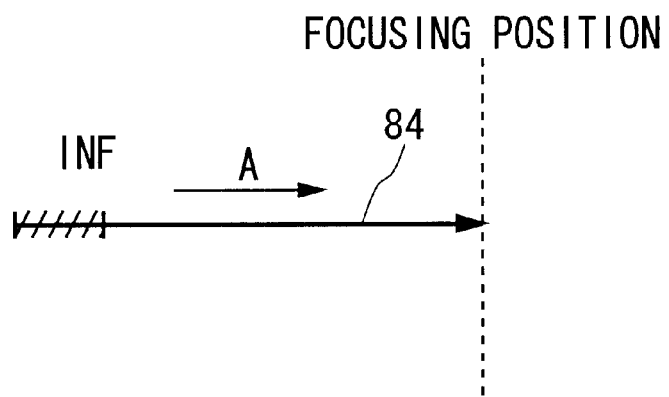
FIG. 7(a) shows the movement of the lens 18.
FIG. 7(b) shows the movement of the lens 18.
Figure 7:
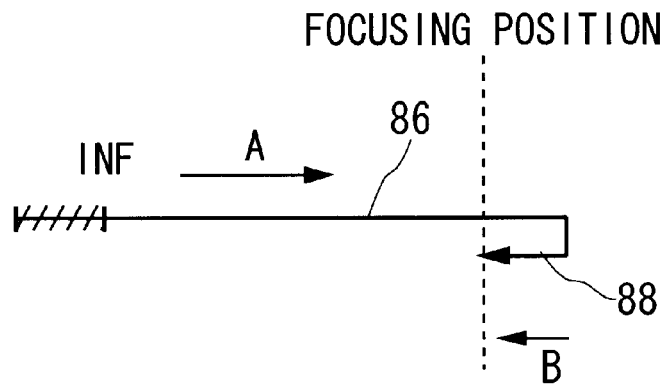

FIGS. 7(a) and 7(b) show the movement of the lens 18 when the imaging apparatus 100 has a function that can measure the distance to a subject. When the imaging apparatus 100 can measure the distance to a subject, a focussing point can be calculated based on the distance to the subject and a characteristic of the lens 18. Therefore, in this case, step S14 of FIG. 5 can be omitted.

FIG. 7(a) shows the movement of the lens 18, where the lens 18 is moved to a focussing position measured previously and then the diaphragm plate 50 is moved in order to have the diaphragm take the open condition. A path 84 represents step S22 of FIG. 5. In the path 84, the actual movement direction of the lens 18 and the movement direction of the lens 18 for moving the diaphragm plate 50 in order to have the diaphragm take the open condition are the same. Thus, by moving the lens 18 to the focussing position, the diaphragm has the desired open condition.

FIG. 7(b) shows the movements of the lens 18, where the lens 18 is moved to a focussing position measured previously, and then the diaphragm plate 50 is moved in order for the diaphragm to have the small aperture condition. Paths 86 and 88 show step S22 of FIG. 5. In the path 86, the actual movement direction of the lens 18 and the movement direction of the lens 18 for moving the diaphragm plate 50 in order for the diaphragm to have the small aperture condition, are not the same. Thus, the lens 18 continues moving in the direction A after passing the focussing point for the movement amount necessary for changing. Then, in the path 88, the lens 18 moves in the direction B for the movement amount necessary for changing. Therefore, the lens 18 moves to the focussing position, with the diaphragm having the small aperture condition.

Although the present invention has been described by way of exemplary embodiments, it should be understood that many changes and substitutions may be made by those skilled in the art without departing from the spirit and the scope of the present invention which is defined only by the appended claims. Some of these embodiments will be described in the following.

Figure 8:
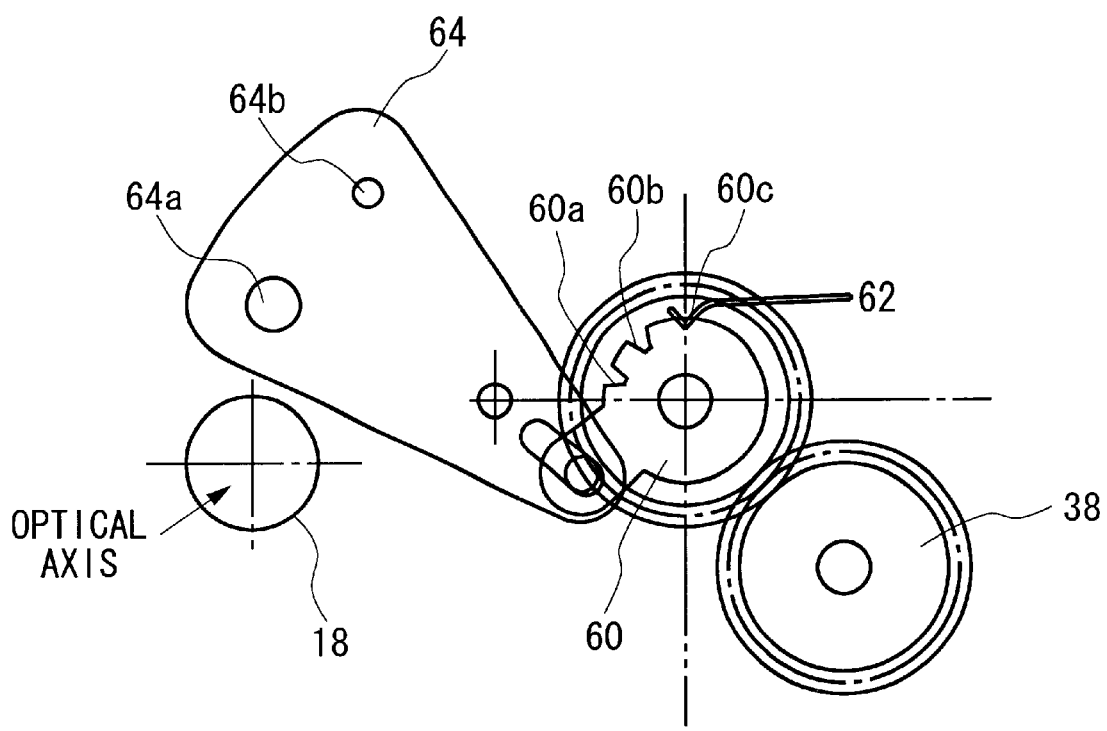
FIG. 8 shows a cross-sectional view of the diaphragm adjusting mechanism 12 in which the diaphragm has a plurality of aperture conditions in addition to the open condition.

As for the first altered embodiment, the diaphragm may have a plurality of aperture conditions. FIG. 8 shows a cross-sectional view of the diaphragm adjusting mechanism 12 in which the diaphragm has a plurality of aperture conditions in addition to the open condition. The diaphragm plate 64 includes a plurality of apertures 64a and 64b. The diaphragm drive shaft 60 includes a plurality of concave portions 60a, 60b and 60c. Furthermore, the diaphragm adjusting mechanism 12 includes a stack spring 62 that fits with concave portions 60a, 60b and 60c, to fix the diaphragm drive shaft 60. The driving force is transmitted from the output gear 38 to the diaphragm drive shaft 60 via the slip mechanism 10. The diaphragm drive shaft 60 is connected with the diaphragm plate 64 and adjusts the position of the diaphragm plate 64 in accordance with the rotational angle of the diaphragm drive shaft 60.

Figure 9:
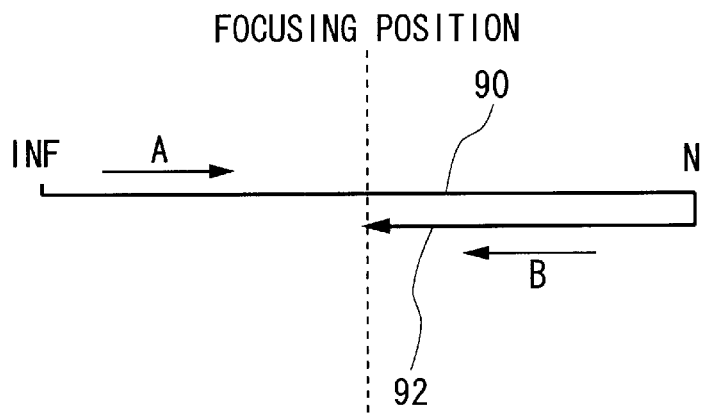
FIGS. 9(a), 9(b) and 9(c) show the movement of the lens 18 of the diaphragm adjusting mechanism 12.
Figure 9:
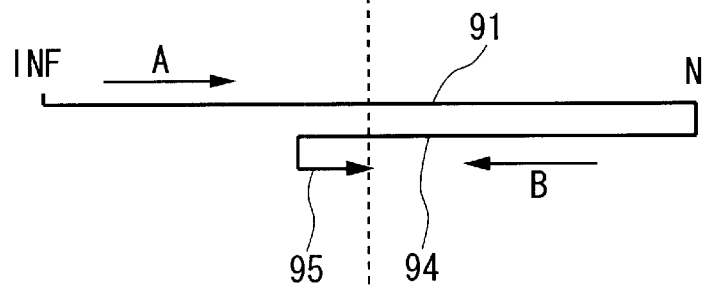
Figure 9:
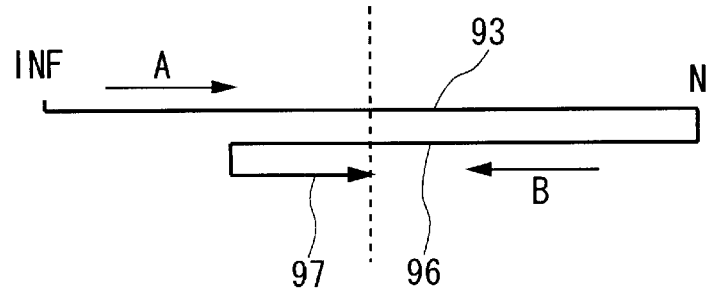

FIGS. 9(a), 9(b) and 9(c) show the movements of the lens 18 of the diaphragm adjusting mechanism 12, explained with reference to FIG. 8. FIG. 9(a) shows the movements of the lens 18 moving to a focussing position, with the diaphragm having the aperture 64b. A path 90 shows step S14 of FIG. 5 and is the same as the path 70 of FIG. 6. Thus, explanation to the path 90 will be omitted. A path 92 shows step S22 of FIG. 5. In the path 92, the actual movement direction of the lens 18 and the movement direction of the lens 18 for moving the diaphragm plate 50 in order for the diaphragm to have the aperture 64b, are the same. Thus, when the lens 18 moves to the focussing position, the diaphragm becomes the aperture 64b.

FIG. 9(b) shows the movement of the lens 18 moving to a focussing position, with the diaphragm having the aperture 64a. A path 91 shows step S14 of FIG. 5 and is the same as the path 70 of FIG. 6. Paths 94 and 95 show step S22 of FIG. 5. In the path 94, the actual movement direction of the lens 18 and the movement direction for moving the diaphragm plate 50 in order for the diaphragm to become the aperture 64a, are not the same. Thus, the lens 18 further moves in the direction B for the movement amount necessary for changing. The movement amount necessary for changing is equal to the movement amount of the lens 18 necessary for moving the diaphragm plate 50 in order for the diaphragm to change to the aperture 64a from the aperture 64b. It means that the movement amount necessary for changing is the movement amount of the lens 18 necessary for the concave portion 60a to fit with the stack spring 62, instead of the concave portion 60b. In the path 95, the lens 18 moves in the direction A for the movement amount necessary for changing. Thus, the lens 18 moves to the focussing position and the diaphragm becomes the aperture 64a.

FIG. 9(c) shows the movement of the lens 18 moving to a focussing position whilst having the diaphragm open. The path 93 shows step S14 of FIG. 5 and is the same as the path 70 of FIG. 6. Thus, explanation of the path 70 will be omitted. Paths 96 and 97 show step 22 of FIG. 5. In the path 96, the actual movement direction of the lens 18 and the movement direction of the lens 18 by which the diaphragm becomes open are not the same, thus, the lens 18 further moves in the direction B for the movement amount necessary for changing. The movement amount necessary for changing is equal to the movement amount of the lens 18 necessary for moving the diaphragm plate 50 in order for the diaphragm to have the open condition. It means that the movement amount necessary for changing is the movement amount of the lens 18 necessary for the concave portion 60c to fit with the stack spring 62 instead of the concave portion 60a. In the path 97, the lens 18 moves in the direction A for the movement amount necessary for changing. Thus, the lens 18 moves to the focussing position, with the diaphragm taking the open condition. Therefore, by forming a plurality of apertures on the diaphragm plate 64 and varying the movement amount necessary for changing in accordance with the position of the apertures, the diaphragm can have a plurality of aperture conditions.

As for the second altered embodiment, the drive mechanism 20 may have a zoom lens attached to the diaphragm plate 50. By providing the zoom lens to the diaphragm plate 50, two mechanisms including: moving the lens 18 to a focussing position and changing the zoom condition, can be driven by a single drive source 32.

As for the third altered embodiment, the drive mechanism 20 may move a zoom lens instead of the focus lens. Thus, two mechanisms including: moving the zoom lens, and adjusting aperture conditions of the diaphragm, can be driven by a single drive source 32.

As described above, according to the present invention, two mechanisms including moving the lens, and adjusting the aperture conditions of the diaphragm can be driven by a single drive source.

Although the present invention has been described by way of exemplary embodiments, it should be understood that many changes and substitutions may be made by those skilled in the art without departing from the spirit and the scope of the present invention which is defined only by the appended claims.

What is claimed is:

1. A drive mechanism for moving a lens and adjusting a diaphragm using a driving force supplied by a single drive source, comprising a transmission mechanism capable of taking a first transmitting condition by which said driving force is transmitted for both adjusting said diaphragm and moving said lens, and a second transmitting condition by which said driving force is transmitted for either adjusting said diaphragm or moving said lens;

wherein both said lens and said diaphragm are driven while said drive source is supplying said driving force to said transmission mechanism taking said first transmitting condition, and either said lens or said diaphragm is driven while said drive source is supplying said driving force to said transmission mechanism taking said second transmitting condition.

2. A drive mechanism as set forth in claim 1, wherein said transmission mechanism includes a slip mechanism provided between said drive source and at least one of said diaphragm and said lens, said slip mechanism transmitting said driving force to at least one of said diaphragm and said lens via a frictional force generated by said slip mechanism while said drive source is supplying said driving force to said transmission mechanism taking said first transmitting condition, and disconnecting transmission of said driving force to at least one of said diaphragm and said lens by slipping between said driving source and said at least one of said diaphragm and said lens while said drive source is supplying said driving force to said transmission mechanism taking said second transmitting condition.

3. A drive mechanism as set forth in claim 2, wherein said drive mechanism further includes a lens moving mechanism moving said lens along an optical axis of said lens, said drive source and said lens moving mechanism being connected without said slip mechanism therebetween, and said drive source and said diaphragm being connected via said slip mechanism, said slip mechanism disconnecting transmission of said driving force to said diaphragm by slipping between said driving source and said diaphragm and transmitting said driving force to said lens while said drive source is supplying said driving force to said transmission mechanism taking said second transmitting condition.

4. A drive mechanism as set forth in claim 3, wherein said diaphragm comprises:

a diaphragm plate adjusting luminous energy applied to said lens; and a position restrictor restricting a movement range of said diaphragm plate such that said diaphragm plate 50 can only move as necessary for adjusting said diaphragm, wherein said slip mechanism is provided between said drive source and said diaphragm plate, and said slip mechanism disconnects transmission of said driving force to said diaphragm by slipping between said driving source and said diaphragm when said position restrictor restricts movement of said diaphragm plate.

5. A drive mechanism as set forth in claim 4, wherein said drive source supplies said driving force to either a forward driving direction or a backward driving direction, said lens moving mechanism includes a mechanism moving said lens along said optical axis thereof in accordance with said driving direction of said driving force, and said diaphragm mechanism includes a mechanism moving said diaphragm plate between a first position to a second position, both provided within said moving range in accordance with said driving direction of said driving force.

6. A drive mechanism as set forth in claim 5, wherein said lens moving mechanism moves said lens within a moving range including a first range necessary for moving said lens to focus on a subject, and a second range necessary for moving said lens in order for said diaphragm plate to move from said first position to said second position or from said second position to said first position of said lens.

7. A drive mechanism as set forth in claim 6, wherein said drive source supplies said driving force until said lens moves to said focussing position, further supplies said driving force, in a same direction, for a movement amount necessary for having said diaphragm plate move from said first position to said second position, or from said second position to said first position, and supplies said driving force, in an opposite direction from said same direction, for said movement amount necessary for changing, when said driving direction of said driving force for moving said lens to a focussing point where said lens is focused on said subject and said driving direction of said driving force for moving said diaphragm plate to a desired either said first position or said second position, are not same.

8. A drive mechanism as set forth in claim 7, wherein said drive source supplies said driving force until said lens moves to said focussing position, when said driving direction of said driving force for moving said lens to a focussing point where said lens is focused on said subject and said driving direction of said driving force for moving said diaphragm plate to desired either said first position or said second position, are same.

9. A drive mechanism as set forth in claim 6, wherein said diaphragm plate is formed with a plurality of apertures each having different diameters, said diaphragm plate being moved by said drive source supplying said driving force until said lens moves to said focussing position, further supplying said driving force in a same direction for a movement amount necessary for having a desired aperture from among said plurality of apertures overlie a predetermined position, and supplying said driving force in an opposite direction from said same direction for said movement, such that light is applied to said lens through said desired aperture.

10. A method of driving for moving a lens and adjusting a diaphragm by a driving force supplied by a single drive source, comprising:

driving said lens and said diaphragm while said drive source is supplying said driving force to said transmission mechanism, taking a first transmitting condition by which said driving force is transmitted for both adjusting said diaphragm and moving said lens, and driving either said lens or said diaphragm while said drive source is supplying said driving force to said transmission mechanism taking said second transmitting condition, by which said driving force is transmitted for either adjusting said diaphragm or moving said lens.

11. A method of driving for moving a lens to a focussing point where said lens is focussed on a subject and adjusting a diaphragm based on brightness of said subject, comprising:

determining a condition for said diaphragm used for photographing said subject by detecting brightness of said subject, detecting said focussing position; and judging whether a first driving direction for moving said lens to said focussing position and a second driving direction for moving a diaphragm plate shutting out light to be applied to said lens to either a first position or a second position, are same;

said method further comprising, when said driving directions are same, supplying said driving force for moving said lens to said focussing position said method further comprising, when said driving directions are not same, supplying said driving force until said lens moves to said focussing position, further supplying said driving force, in a same direction, for a movement amount necessary for having said diaphragm plate move from said first position to said second position, or from said second position to said first position, and supplying said driving force, in an opposite direction from said same direction, for said movement amount necessary for changing.

12. An imaging apparatus for photographing a desired subject, comprising:

an imaging unit forming an image of said subject;

a lens imaging said subject on said imaging unit;

a diaphragm adjusting luminous energy applied to said lens; and a drive mechanism moving said lens and adjusting said diaphragm by a driving force supplied from a drive source;

wherein said drive mechanism comprising a transmission mechanism capable of taking a first transmitting condition by which said driving force is transmitted for both adjustment of said diaphragm and movement of said lens, and a second transmitting condition by which said driving force is transmitted for either adjustment of said diaphragm or movement of said lens; and both said lens and said diaphragm are driven while said drive source is supplying said driving force to said transmission mechanism taking said first transmitting condition, and either said lens or said diaphragm is driven while said driving source is supplying said driving force to said transmission mechanism taking said second transmitting condition.

13. An imaging apparatus as set forth in claim 12, wherein said transmission mechanism includes a slip mechanism provided between said drive source and at least one of said diaphragm and said lens, said slip mechanism transmitting said driving force to at least one of said diaphragm and said lens via a frictional force generated by said slip mechanism while said drive source is supplying said driving force to said transmission mechanism taking said first transmitting condition, and disconnecting transmission of said driving force to at least one of said diaphragm and said lens by slipping between said driving source and said at least one of said diaphragm and said lens while said drive source is supplying said driving force to said transmission mechanism taking said second transmitting condition.

14. An imaging apparatus as set forth in claim 13, wherein said drive mechanism further includes a lens moving mechanism moving said lens along an optical axis of said lens, said drive source and said lens moving mechanism being connected without said slip mechanism therebetween, and said drive source and said diaphragm being connected via said slip mechanism, said slip mechanism disconnecting transmission of said driving force to said diaphragm by slipping between said driving source and said diaphragm and transmitting said driving force to said lens while said driving source is supplying said driving force to said transmission mechanism taking said second transmitting condition.

15. An imaging apparatus as set forth in claim 14, wherein said diaphragm comprises:

a diaphragm plate adjusting luminous energy applied to said lens; and a position restrictor restricting a movement range of said diaphragm plate such that said diaphragm plate 50 can only move as necessary for adjusting said diaphragm, wherein said slip mechanism is provided between said drive source and said diaphragm plate, and said slip mechanism disconnects transmission of said driving force to said diaphragm by slipping between said driving source and said diaphragm when said position restrictor restricts movement of said diaphragm plate.

16. An imaging apparatus as set forth in claim 15, wherein said drive source supplies said driving force in either a forward driving direction or a backward driving direction, said lens moving mechanism includes a mechanism moving said lens along said optical axis thereof in accordance with said driving direction of said driving force, and said diaphragm mechanism includes a mechanism moving said diaphragm plate between a first position to a second position, both provided within said moving range in accordance with said driving direction of said driving force.

17. An imaging apparatus as set forth in claim 16, wherein said lens moving mechanism moves said lens within a moving range including a first range necessary for moving said lens to focus on a subject, and a second range necessary for moving said lens in order for said diaphragm plate to move from said first position to said second position or from said second position to said first position of said lens.

18. An imaging apparatus as set forth in claim 17, wherein said drive source supplies said driving force until said lens moves to said focussing position, further supplies said driving force, in a same direction for an amount necessary for having said diaphragm plate move from said first position to said second position, or from said second position to said first position, and supplies said driving force in an opposite direction from said same direction for said amount necessary for changing, when said driving direction of said driving force for moving said lens to a focussing point where said lens is focused on said subject and said driving direction of said driving force for moving said diaphragm plate to desired either of said first position or said second position, are not same.

19. An imaging apparatus as set forth in claim 18, wherein said drive source supplies said driving force until said lens moves to said focussing position, when said driving direction of said driving force for moving said lens to a focussing point where said lens is focused on said subject and said driving direction of said driving force for moving said diaphragm plate to desired either of said first position or said second position, are same.

20. An imaging apparatus as set forth in claim 19, wherein said imaging unit generates image data by converting said image of said subject into electric signals, said imaging apparatus further comprises a memory unit storing said image data.

\* \* \* \* \*